United States Patent Office 3,328,903
Patented July 4, 1967

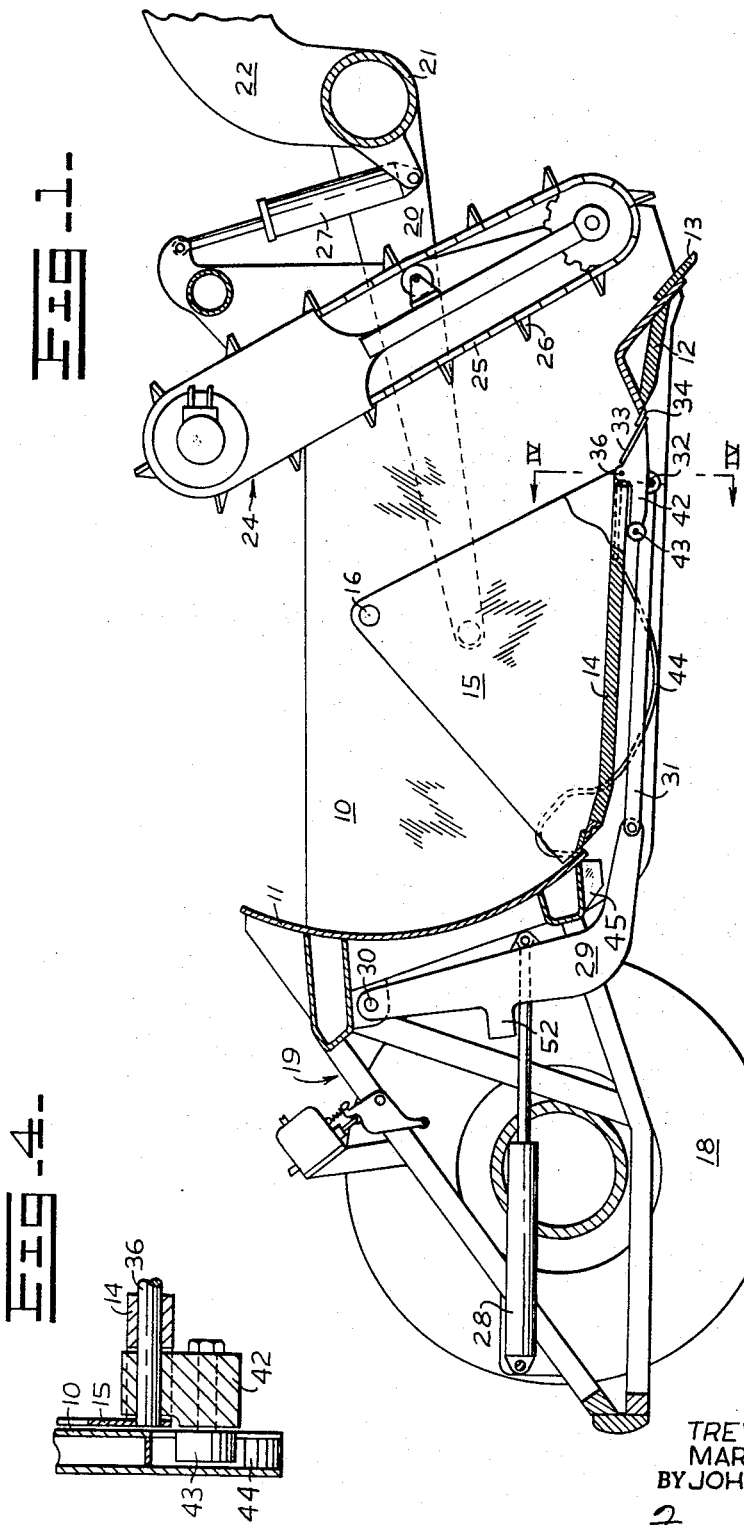

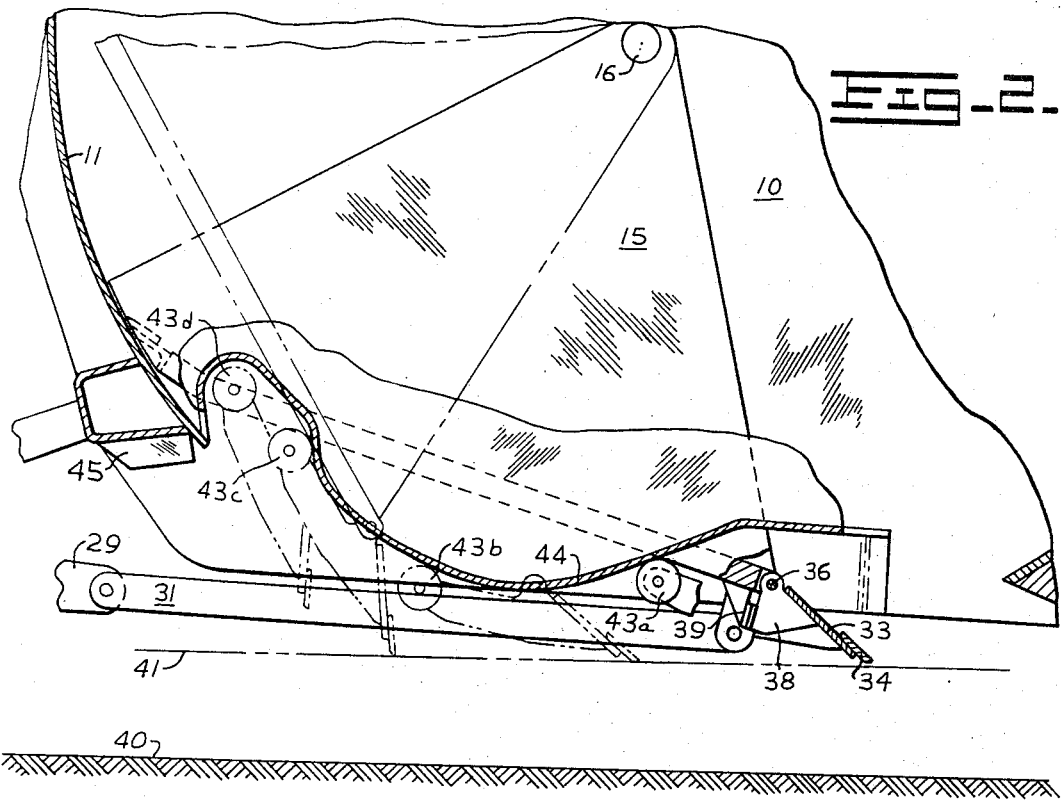
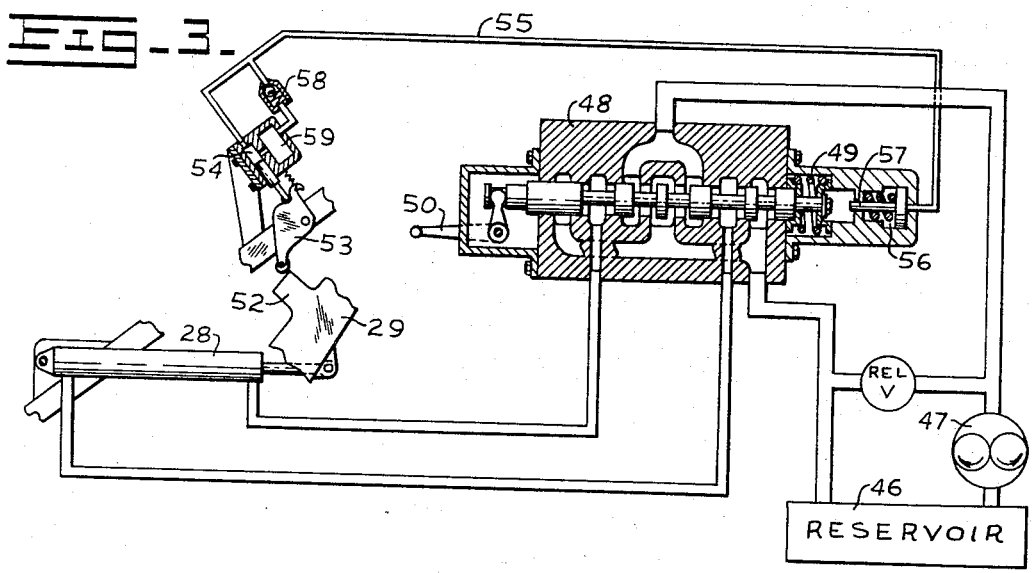

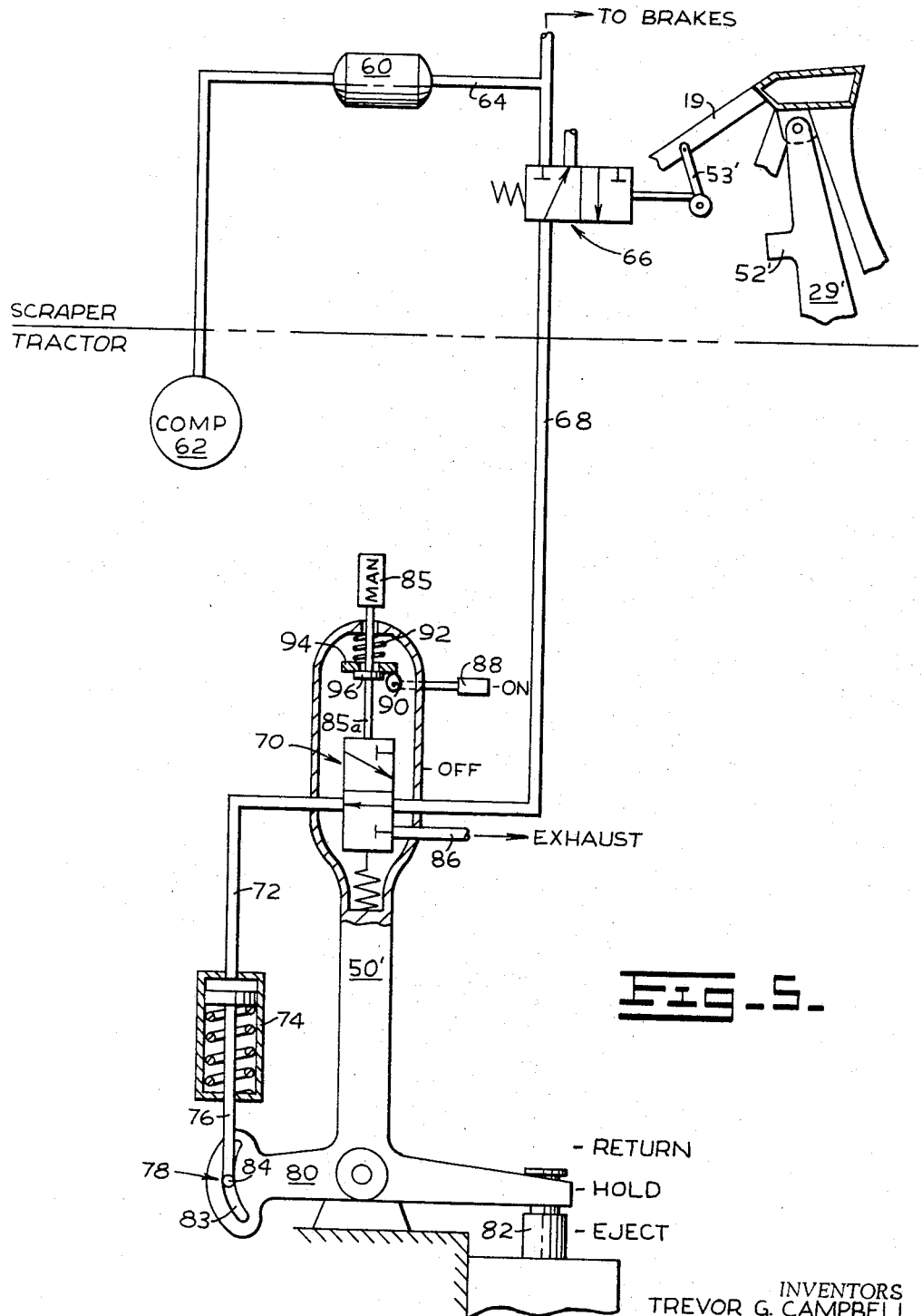

3,328,903
EJECTOR MECHANISM FOR EARTHMOVING SCRAPER
Trevor G. Campbell, Peoria, Marvin G. Getz, Morton, and John S. Logsdon, Chillicothe, Ill., assignors to Caterpillar Tractor Co., Peoria, Ill., a corporation of California
Filed Apr. 2, 1964, Ser. No. 356,750
2 Claims. (Cl. 37—129)

This invention relates to earthmoving scrapers and particularly to ejection mechanism for discharging a load of earth from the scraper.

The invention is particularly adapted to so-called self-loading scrapers which have an elevator-type loading mechanism disposed forwardly of the bowl in a position which makes forward ejection of a load as by conventional ejectors impractical.

It is an object of the present invention to provide an ejection mechanism which is easily operated through extremely simple means to open the bottom of the bowl and simultaneously scrape or scour the back of the bowl to insure discharge of material.

Another object is to provide a bowl ejector which pivots or swings to its open position and having a striker plate and means to hold the striker plate at a substantially constant height with respect to the earth notwithstanding the movement of the ejector.

A still further object of the invention is to provide a signal means for advising an operator when the ejector occupies a given open position.

Further and more specific objects and advantages will be made apparent in the following specification wherein reference is made to the accompanying drawings.

In the drawings:

FIG. 1 is a central longitudinal sectional view of an earthmoving scraper embodying the present invention;

FIG. 2 is an enlarged sectional view taken through the bowl of the scraper and illustrating different positions of the ejector mechanism;

FIG. 3 is a schematic illustration of a signal mechanism employed for advising the operator when the ejector mechanism has attained a given position;

FIG. 4 is an enlarged fragmentary view taken on line IV—IV of FIG. 1 illustrating the relationship of some of the components thereof; and, FIG. 5 is a schematic illustration of an alternate design of signal mechanism employed for the same purpose as that shown in FIG. 3.

The scraper shown in FIG. 1 has a bowl formed of side walls, one of which is shown at 10, a back wall 11 extending between the side walls and a small fixed bottom plate shown at 12 to which a cutting edge 13 is secured. A movable bottom plate 14 with side members 15, one of which is shown pivotally connected as at 16 to the side 10 of the bowl, forms the ejector. The bowl structure just described is supported rearwardly on a pair of wheels, one being shown at 18 supported by conventional frame work, generally indicated at 19, suitably secured to the bowl. The forward end of the bowl is supported by a pair of draft arms, one shown at 20, connected by a spreader 21 which carries a gooseneck, part of which is shown at 22 supported at its forward end by the rear of a tractor in a well-known manner.

The scraper shown is of the self-loading type which includes an elevator structure, generally indicated at 24, disposed within the forward open end of the bowl and adapted to be actuated to move a chain 25 and associated pusher plates 26 in a clockwise direction. No further details of the elevator construction are necessary to an understanding of the present invention but it will suffice to know that its operation is briefly as follows. The bowl is lowered by actuation of a bowl jack 27 connected between the forward end of the bowl and the spreader 21. With the bowl lowered until the cutting edge 13 penetrates the earth, forward movement causes loading of earth into the bowl and this loading is assisted by operation of the elevator 24 thus making unnecessary the use of pusher tractors as usually required during the operation of a large earthmoving scraper.

From the construction described, it is apparent that ejection of earth through the forward end of the bowl by a conventional ejector is not practical. According to the present invention, ejection is accomplished by swinging the movable plate 14 rearwardly about its pivotal support 16. The back 11 of the bowl is formed on an arc struck from the center 16 so that the rear edge of the movable bottom 14 cleans or scours the earth from the back as it swings upwardly. Opening and closing of the bottom or ejector is accomplished with a hydraulic jack 28 disposed between the frame work 19 and a lever 29 pivoted to the frame work as at 30. The opposite end of the lever 29 is connected with a link 31 which is in turn connected to the movable bottom 14 as at 32. Consequently retraction of the jack 28 effects swinging movement of the bottom 14 and its supporting plate 15. The jack 28 as well as the previously mentioned bowl jack 27 are conventionally actuated by hydraulic fluid under pressure from a source and by controls not shown.

It is desirable when discharging a load from the scraper to be able to strike or level the discharging load as by passing an edge over the load which is held at a uniform height with respect to the ground. In the present case, the forward edge of the bottom 14 cannot do the striking as it is passing through an arc during its opening movement. A special striking mechanism comprises a striker plate 33, best shown in FIG. 2, with a hardened edge 34 secured thereto. This striker plate is pivotally connected to the forward edge of the movable bottom 14 as at 36. When the bottom is in its forward position, or closed, as shown in FIG. 1, a part 38 (see FIG. 2) depending from the striker plate, engages a part 39 secured to the bottom plate to position the striker plate as shown in FIG. 1 where it closes the space existing between the stationary bottom plate 12 and the movable bottom plate 14.

When the ejector is swung to its open position, the striker plate is caused to follow a rectlinear path which is substantially parallel to the surface of the earth where the load is being deposited. This is best illustrated in FIG. 2 where the surface of the earth is shown at 40 and the striker plate is shown as following a line 41 parallel thereto. A pair of levers 42, one at each end of the striker plate, carry rollers 43 which engage a cam surface 44 as the ejector swings toward its open position. The cam surface is formed adjacent the lower edge of each bowl wall 10 as best shown in FIG. 4. As shown in FIG. 2, the roller 43 engaging the cam 44 passes through positions shown at 43a, 43b and 43c with the edge 34 of the striker plate remaining substantially the same height above the surface of the ground. At the position 43c, the ejector is substantially fully open and the entire contents of the bowl will have been discharged with the exception that in some cases as with sticky earth a jarring action is required. This may be accomplished by further opening movement bringing the striker plate to the position illustrated at 43d where the link 31 engages a stop member 45 mounted on the rear frame work 19 which stops further movement and jars or vibrates the bowl and ejector to insure discharge of the remainder of its contents. Since it is unnecessary except in occasional operating conditions to so jar the bowl, the present invention provides means to signal the operator when the ejector has attained the nearly open position with the rollers at 43c as shown in FIG. 2 so that he can discontinue opening movement unless further such movement appears necessary. This is accomplished by the circuit schematically illustrated in FIG. 3. Fluid from a reservoir 46 is directed by a pump 47 through a control valve 48 to the rod end of the jack 28 to actuate the lever 29 and ejector as previously described. The control valve is shown in its hold position in which it is normally maintained by a centering spring 49. In this position, there is no communication between the pump and the jack and no communication between opposite ends of the jack. To impart opening movement to the ejector, a valve control lever 50 is moved in a clockwise direction to communicate pump pressure to the rod end of the jack. When the ejector reaches the open position represented where the roller is at 43c in FIG. 2, an extension 52 on the lever 29 engages a pivoted cam 53 carried on the frame work 19 and swings this cam to actuate the piston of a master cylinder 54. Fluid is thus directed in a closed circuit including a line 55 to a slave cylinder 56 associated with the valve 50 and having a piston with a rod 57 which is caused to engage and exert pressure against the end of the spool of the valve 47. The operator will sense this with his hand on the lever 50 and will return the lever and spool to the hold position. In case it is necessary to jar the bowl for the purpose of dislodging sticky contents, the operator can overcome the action of the piston rod in the slave cylinder forcing the fluid back through the line 55 and through a check valve 58 into a reservoir 59. The reservoir maintains fluid in the closed circuit master slave system. In this manner the ejector is caused to continue movement to the position 43d of FIG. 2 and produce the desired jarring effect.

In instances where a supply of pressurized air is available on the scraper for actuation of brakes, etc., it may be desirable to employ pressurized air for signaling the operator when the movable bottom 14 is at the position 43c of FIG. 2, as heretofore described. As shown in FIG. 5, the alternate signaling system utilizes compressed air from a storage tank 60 mounted on the scraper frame rearwardly of the bowl and which is supplied by an air compressor 62 provided on the tractor. In this system an air supply line 64, which communicates between tank 60 and the scraper brakes or other air actuated components, is also connected to the inlet port of a signal valve generally indicated at 66. The outlet of valve 66 communicates through a line 68 with a normally-open air valve, generally indicated at 70, which is mounted internally of the operator's ejector control lever 50'. The outlet of valve 70 communicates through a line 72 with the upper end of an air cylinder 74 which in turn has its piston rod 76 connected as by a lost motion connection 78 with an arm 80 of control lever 50'.

Movement of lever 50' in a clockwise direction positions a control spool 82 to direct hydraulic fluid to the floor actuating jack (illustrated at 28 in FIG. 3) to pivot the movable bowl floor to its open or eject position. This also rotates arm 80 such that the lower end of an arcuate slot 83 is adjacent a pin 84 in the lower end of piston rod 76. As bottom 14 reaches a nearly-open position, with the rollers 43 at the position 43c, projection 52' on floor actuating lever 29' engages the free end of a lever 53' to move valve 66 to its open position, communicating pressurized air from tank 60 through lines 64, 68, normally-open valve 70 and line 72 to the upper end of cylinder 74. This is effective to extend piston rod 76 and return lever 50' to its neutral or hold position.

In the event it is necessary to jar or vibrate the bowl and ejector, as previously described, an override button 85 may be depressed to move valve 70 to a position blocking line 68 and communicating line 72 and the head end of cylinder 74 to exhaust port 86. This permits the operator to return lever 50' and spool 82 to the eject position, thus moving bottom 14 to its fully-open position wherein link 31 engages stop member 45 as shown in FIGS. 1 and 2.

Since the scraper may be operated for extended periods of time in material requiring that the ejector be fully opened, it is desirable that a means be provided to inactivate the signaling mechanism such that the operator is not required to depress the override button 85 each time he ejects material from the scraper bowl. In order to accomplish this, a shut-off lever 88 mounted on control lever 50' may be moved to the "off" position to rotate a cam 90 and permit a spring 92 acting through a washer 94 and a shoulder 96 on an extension 85a of override button 85 to move valve 70 downward to its "off" position. In this manner communication between line 68 and cylinder 74 is blocked such that the signaling device is inoperative even though valve 66 is moved to its "open" position as previously described during operation of the ejector.

We claim:

1. In an earthmoving scraper having a bowl with an opening formed in the bottom thereof, side walls and a back wall, means to eject contents of the bowl comprising a plate closing said opening, means supporting said plate including pivotal connections with the sides of the bowl, power means to swing said plate about said pivotal connections to effect ejection of bowl contents through said opening, a striker plate carried forwardly of the ejector plate at a location remote from the pivotal connection, and means to cause the striker plate to follow a rectlinear path as the ejector plate moves through an arc.

2. The invention of claim 1 wherein the striker plate is pivotally connected to the ejector plate and extends downwardly therefrom wherein the distance which said striker plate extends from the ejector plate is a function of the angular position of said striker plate, cam followers carried by said striker plate, and cam surfaces on the sides of the bowl engaged by the followers to angularly position the striker plate as the ejector plate moves through its arc.

References Cited
UNITED STATES PATENTS

| | | | |
|---|---|---|---|
| 2,988,832 | 6/1961 | Hancock et al. | 37—129 |
| 3,042,376 | 7/1962 | Miller | 37—126 X |
| 3,057,090 | 10/1962 | Mazzarins | 37—126 |
| 3,108,388 | 10/1963 | Johnson | 37—8 X |
| 3,292,279 | 12/1966 | Rockwell et al. | 37—129 |

ABRAHAM G. STONE, *Primary Examiner.*

WILLIAM A. SMITH III, *Examiner.*

A. E. KOPECKI, *Assistant Examiner.*